United States Patent [19]

Henderson

[11] 4,046,022
[45] Sept. 6, 1977

[54] BELT DRIVE SYSTEM
[75] Inventor: Dewey D. Henderson, Springfield, Mo.
[73] Assignee: Dayco Corporation, Dayton, Ohio
[21] Appl. No.: 694,409
[22] Filed: June 9, 1976
[51] Int. Cl.$^2$ .................. F16H 9/00; F16H 11/00
[52] U.S. Cl. .................................................. 74/220
[58] Field of Search ........................ 74/220, 242.1
[56] References Cited

U.S. PATENT DOCUMENTS

| | | | |
|---|---|---|---|
| 2,583,272 | 1/1952 | Metzler | 74/220 |
| 2,838,124 | 6/1958 | Cramer, Jr. | 74/220 X |
| 2,884,796 | 5/1959 | Ciaccio | 74/220 |
| 2,903,077 | 9/1959 | Kamlukin | 74/220 X |
| 3,396,590 | 8/1968 | Verdery, Jr. | 74/220 |
| 3,722,277 | 3/1973 | Fell et al. | 74/220 |
| 3,728,905 | 4/1973 | Fell et al. | 74/220 |

Primary Examiner—Leonard H. Gerin
Attorney, Agent, or Firm—Reuben Wolk

[57] ABSTRACT

In an apparatus which has a driving shaft which is rotatable at a first fixed position in one direction only and a driven shaft which is rotatable at a second fixed position remote from the first position, the improvement comprising a belt drive system for selectively rotating the driven shaft in the one direction and in an opposed direction.

28 Claims, 7 Drawing Figures

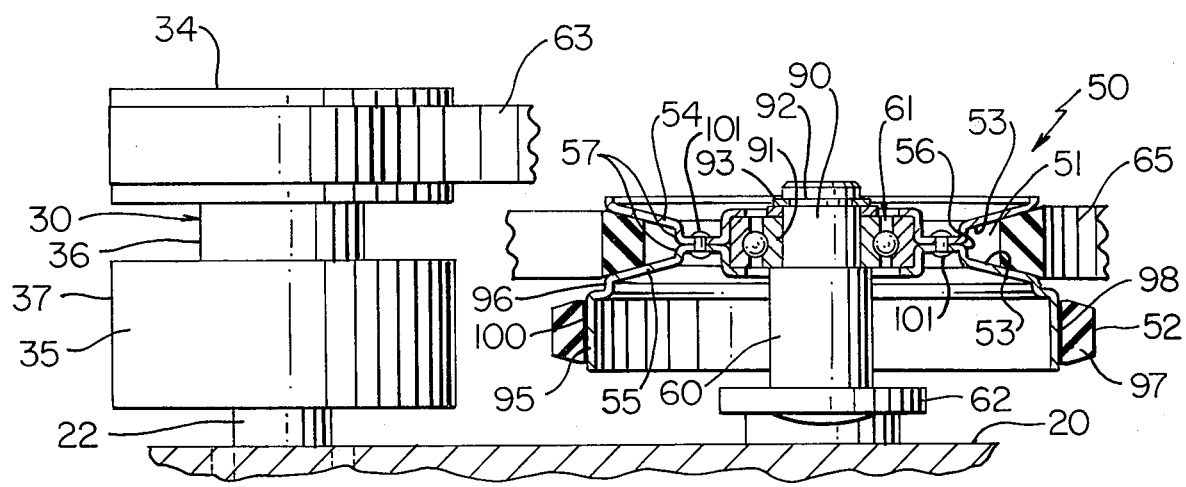
FIG. 4
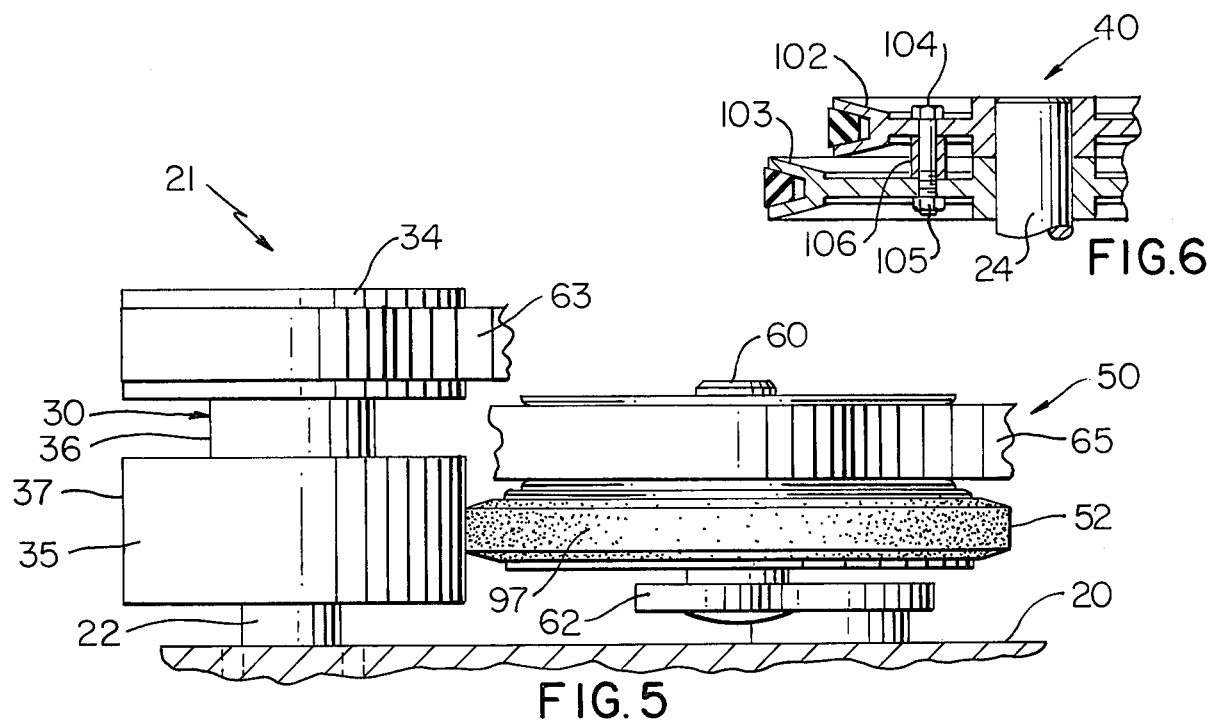
FIG. 6
FIG. 5
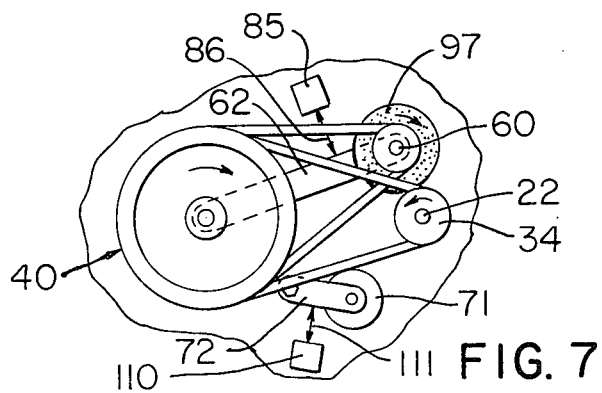
FIG. 7

BELT DRIVE SYSTEM

BACKGROUND OF THE INVENTION

There are numerous self-propelled machines or apparatus available on the market both of the gasoline powered variety and electric powered variety which are used in gardening and in the maintenance of lawns. In such machines which have means providing self-propelled movement during both forward and reverse operation thereof, or like, various complex systems are employed which may utilize chain drives, special gear systems, complex clutching mechanisms, complicated belt arrangements using belts which are required to slip most of their operating life, or various combinations of these complex systems whereby the cost to provide such self-propelled forward and reverse movement is substantial.

SUMMARY

It is a feature of this invention to provide an improved belt drive system of simple and economical construction which may be used particularly on gardening and lawn care machines or apparatus to provide both forward and reverse self-propelled movement thereof.

Another feature of this invention is to provide in an apparatus of the character mentioned which has a driving shaft which is rotatable at a first position in one driving shaft which is rotatable at a first position in one direction only and a driven shaft which is rotatable at a second position remote form the first position, an improved belt drive system for selectively rotating the driven shaft in both opposed directions.

Another feature of this invention is the provision of a belt drive system of the character mentioned which may be operated without a special clutch device.

Another feature of this invention is the provision of a belt drive system of the character mentioned which may be used in lieu of a transmission system.

Another feature of this invention is the provision of a belt drive system of the character mentioned which may employ sheaves and driving surfaces of different diameters to provide desired speed changes and torques with optimum simplicity.

Another feature of this invention is the provision of a belt drive system of the character mentioned which uses commercially available V-belts.

Another feature of this invention is the provision of a belt drive system of th character mentioned which employs a movable sheave assembly having a driven surface provided as an extension of a sheave flange and such sheave assembly is used with its driven surface engaging a driving surface to provide rotation in a particular direction.

Another feature of this invention is the provision of a movable sheave assembly of the character mentioned which is rotatably supported at one end of an arm which has its opposite end pivotally supported at a fixed pivot point and wherein the location of the fixed pivot point and the length of the arm may be selected to control the tension in a belt associated therewith as a function of the pivoted position of the movable sheave assembly.

Therefore, it is an object of this invention to provide an improved belt drive system having one or more of the novel features set forth above or hereinafter shown or described.

Other objects, features, details, uses, and advantages of this invention will be readily apparent from the embodiments thereof presented in the following specification, claims, and drawings.

BRIEF DESCRIPTION OF THE DRAWINGS

The accompanying drawings shown present preferred embodiments of this invention, in which

FIG. 4 is a fragmentary view drawn to an enlarged scale and taken esentially on the line 4—4 of FIG. 1;

FIG. 5 is a fragmentary view drawn to an enlarged scale and taken essentially on the line 5—5 of FIG. 2;

FIG. 6 is a view showing a modified driven sheave assembly which may be used in lieu of the sheave assembly of FIG. 1; and FIG. 7 is a fragmentary view illustrating that the movable sheave assembly may be installed on a pivot having an axis which coincides with the axis of the driven sheave assembly and also illustrating a tensioning idler which is free to be moved independently of the movable sheave assembly.

DESCRIPTION OF ILLUSTRATED EMBODIMENTS

Figure 1:
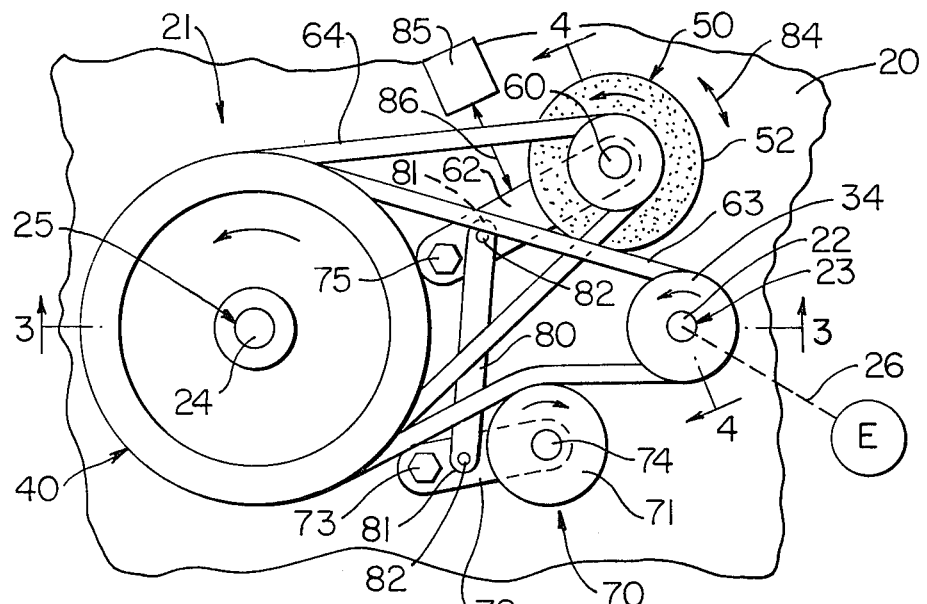
FIG. 1 is a fragmentary plan view of an improved belt drive system of this invention installed on an apparatus which has a driving shaft which is rotatable at a first position in one direction only and which has a driven shaft which is rotatable at a second position in opposed directions, and illustrating the belt drive system operating such that the driving shaft and driven shaft are rotating in a counterclockwise direction.
Figure 2:
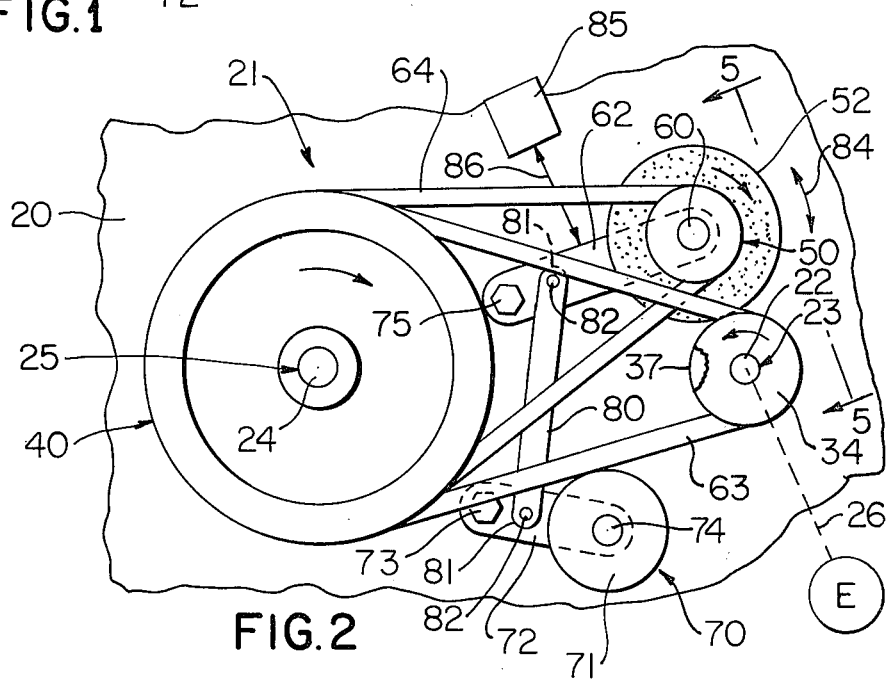
FIG. 2 is a view similar to FIG. 1 illustrating the belt drive system operating so that the driving shaft is still rotating counterclockwise and the driven shaft is being rotated clockwise through the action of a sheave assembly of the belt drive system.

Reference is now made to FIGS. 1 and 2 of the drawings which illustrate a fragmentary portion of a machine or apparatus which is designated generally by the reference numeral 20 and such apparatus may be a self-propelled lawn mower, garden tiller, or similar equipment of the type used to maintain lawns, gardens, and the like; and such apparatus 20 employs an exemplary embodiment of the belt drive system of this invention wich is designated generally by the reference numeral 21. The apparatus 20 has a driving shaft 22 which is rotatable at a first fixed position 23 in one sense or direction only, shown as counterclockwise in this embodiment; and, such apparatus has a driven shaft 24 which is rotatable at a second fixed position 25 which is remote from the first position 23. The belt drive system 21 of this invention is provided for selectively rotating the driven shaft 24 in the one direction, i.e., counterclockwise, and in an opposite sense or direction, i.e., clockwise. The driving shaft 22 is of the type usually provided as a power take-off shaft from an engine E of the machine or apparatus 20 or may be a suitable power shaft which extends from a transmission device which is in turn suitably operatively connected to the engine E of th apparatus 20. A dot-dash line 26 in FIGS. 1 and 2 is shown to schematically represent the operative connection between the engine E and the driving shaft 22 regardless of whether a transmission is employed.

Figure 3:
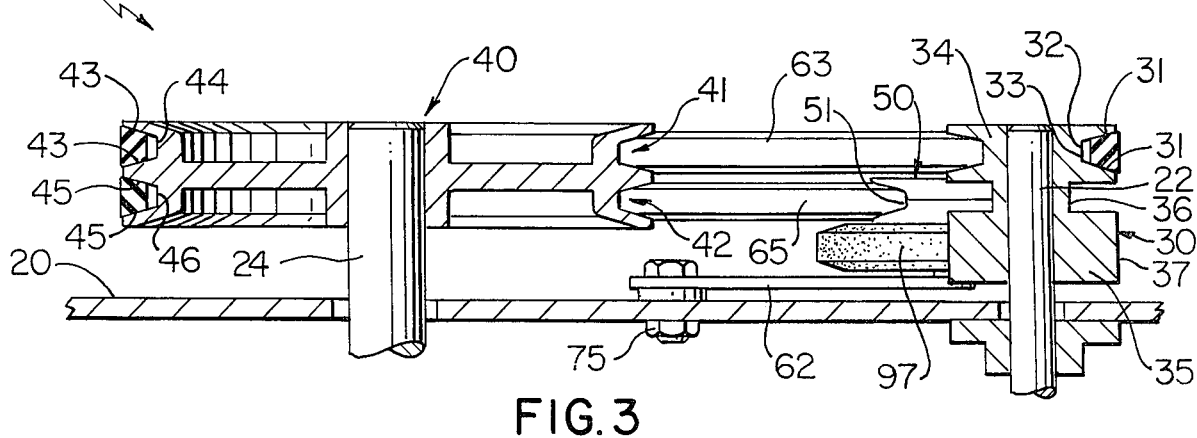
FIG. 3 is a fragmentary view drawn to an enlarged scale and taken essentially on the line 3—3 of FIG. 1.

The belt drive system 21 comprises a driving sheave assembly 30, see FIG. 3, which is suitably detachably fastened to the driving shaft 22 and the driving sheave assembly 30 has suitable means in the form of a pair of inclined surfaces 31 interconnected by a cylindrical surface 32 at their inner edges to define a first belt-receiving groove 33. The surfaces 31, 32, and adjoining parts define a sheave portion 34 of the assembly 30. The driving sheave assembly 30 has a disc-like portion 35 which extends as an enlargement from a reduced diameter or a necked portion 36 of the driving shaeve assembly 30 and the disc-like portion 35 has a driving surface 37 which will be described in detail subsequently. The sheave portion 34 and the disc-like portion 35 define the diriving sheave assembly 30 in this example as a single-piece construction.

As seen in FIG. 3, the belt drive system 21 has a driven sheave assembly which is designated generally by the reference numberal 40 and which is suitably detachably fastened to the driven shaft 24. The driven sheave assembly 40 has means, now to be described, defining a first belt-receiving groove 41 and a second belt-receiving groove 42 therein. The groove 41 is defined by a pair of opposed inlcined surfaces 43 interconnected at their inner edges by a right circular cylindrical surface 44. Similarly, the groove 42 is defined by a pair of opposed inclined surfaces 45 interconnected at their inner edges by a right circular cylindrical surface 46.

The belt drive system 21 has a movable sheave assembly which is designated generally by the reference numeral 50, see FIG. 4; and, the movable sheave assembly 30 50 is movable toward and away from the driving sheave assembly 30 in a manner to be described in detail subsequently. the movable sheave assembly 50 has means therein defining what will be identified (for convenience of claiming) as a second belt-receiving groove 51 and the movable sheave assembly 50 has a driven surface 52. The groove 51 is defined by a pair of opposed inclined surfaces 53 which comprise the inside surfaces of a pair of flange members, one of which is designated by the reference numberal 54 and the other of which is designated by the reference numberal 55. The inclined surfaces 53 are adjoined at their inner edges by an interconnecting surface 56 which is comprised of two substantially identical surface portions each surface portion is provided as a surface of an offset portion 57 of each flange 54 and 55. The movable sheave assembly 50 is suitably supported for substantially friction-free rotation on an assoicated shaft 60 by antifriction bearing means shown as a ball bearing assembly 61. The shaft 60 is suitably fixed to an elongated mechanical member 62 which will be described in more detail subsequently.

The belt drive system 21 has a first belt 63 disposed in what were proveiously referred to as the first grooves in the previously described sheave assemblies, see FIGS. 3 and 4. In particular the belt 63 is disposed in the groove 33 of the sheave assembly 30 and the groove 41 of the sheave assembly 40; and, the belt 63 is provided for rotating the driven sheave assembly 40 in the one direction shown as counterclockwise in FIG. 1 under conditions where the movable sheave assembly 50 is disposed or maintained in spaced relation from the driving sheave assembly 30 so that the driving surface 37 of assembly 30 is out of contact with the driven surface 52 of assembly 50. The belt system 21 has a second belt 65 which is disposed in what has been described as the second grooves, namely the groove 51 of the movable sheave assembly 50 and the groove 42 of the driven sheave assembly 40.

The belt drive system 21 has means designated generally by the reference numberal 70 which serve the dual purpose of first moving the movable sheave assembly 50 so that its driven surface 52 is brough into engagement and friction contact with the driving surface 37 and second creating slack in the first belt or belt 63 rendering it inoperative. The belt 63 is provided with sufficient slack such that with the movable assembly 50 against assembly 30 the driven sheave assembly 40 is not rotated by belt 63 and instead the driving sheave assembly 30 provides rotation of the driven sheave assembly 40 in the opposite direction, i.e., clockwise, as shown in FIG. 2. The clockwise drotation of sheave assembly 40 is provided as shown in FIG. 2 through the action of driving surface 37 engaging the driven surface 52 to rotate the sheave assembly 50 clockwise and with the belt 65 and in turn to assembly 40.

The dual-purpose means 70 comprises an idler roller or sheave 71 adapted to engage the belt 63 to provide tension therein with the driving sheave assembly 30 rotating counterclockwise as shown in FIG. 1 and with the assembly 50 disposed remote from assembly 30 to thereby assure that torque is transmitted to the sheave assembly 40 by belt 63 in a non-slipping manner. The dual-purpose means 70 also comprises a mechanical link or elongated member 72 which is attached for pivoting movement about a pivot pin 73; and, the idler sheave 71 is supported for rotation about a shaft 74 at the swinging end of the member 72.

The dual-purpose means 70 also comprises the previously mentioned member 62 which is attached for pivoting movement about a pivot pin 75 and the previously described shaft 60 is fixed to the terminal end portion of the member 62. The dual-purpose means 70 also comprises a connecting rod or member 80 which has opposed end portions 81 pivotally attached to the link 62 and 72 by suitably installed pins 82. Accordingly, upon moving the movable sheave assembly 50 to the position illustrated in FIG. 1 it will be seen that the member 80 meoves the member 72 and tension-applying idler sheave 71 into engagement with the belt 63 to provide a controlled tension thereagainst; and, upon moving the sheave assembly 50 to the position illustrated in FIG. 2 the member 80 moves the member 72 and the idler sheave 71 out of tension-applying engagement with the belt 63 thereby allowing such belt to slip and remain stationary with rotation of the drive assembly 30.

The movable sheave assembly 50 may be moved toward and away from driving sheave assembly 30 as indicated by the double arrow 84 in FIGS. 1 and 2 and any suitable actuating or moving means or device may be provided for moving the movable sheave assembly 50 and such device, being of any known construction, is shown schematically as a rectangular block 85 provided with an actuator (shown as an arrow) 86 extending from block 85 and engaging by being connected to member 62. The device 85 may exert a yielding force of controlled minimum magnitude which assures positive engagement of the drivin surface 52 against the driving surface 37. The device 85 may exert force at any position on the means 70 for the purpose of moving the movable sheave assembly 52 and the idler sheave 71 toward and away from the driving sheave assembly 30 and belt 63 respectively.

As previously mentioned, the movable sheave assembly 50 is supported by an anti-friction ball bearing assembly 61 at the end of the shaft 60, see FIG. 4. The shaft 60 has a reduced diameter terminal end portion 90 which is adapted to receive an inner race 91 of the bearing assembly 61 there-against and has an annular groove 92 therein for receiving a snap ring retainer 93 which holds the bearing assembly 61 in position on the shaft 60. The flange portions 54 and 55 of the assembly 50 define the outer housing for the members of the bearing assembly 61 and thus result in reducing the complexity and cost of such bearing assembly.

The flange portion 55 of assembly 50 has a tubular outer portion 95 defined as an integral part thereof and connected to the main portion of the flange 55 by an integral L-shaped outwardly offset portion 96. The outer portion 95 may be considered as a disc member which is made as single piece with flange portion 55 of a side flange of a belt sheave. The tubular member 95 has an annular member 97 preferably made of an elastomeric material, shown as rubber in this example, suitably fixed to its outside surface 98 using any suitable means such as an adhesive 100 indicated by a heavier line 100 at the interface of the member 97 and the portion 95. The driven surface 52 is defined as a right cylindrical outside surface of the rubber member 97 and such surface has a comparatively high coefficient of friction as compared to machined metal, such as steel, for example.

The flange portions 54 and 55 are suitably fixed together using any suitable technique known in the art and in this example they are fixed together by a plurality of rivets 101 which are fastened on a common circumference concentric about the axis of the shaft 60.

The flange portions 54 and 55 of the sheave assembly 50 are preferably made from sheet metal members which are formed by stamping, or the like; however, it will be appreciated that the assembly 50 and all of its components may be made by any other suitable process or technique knwon in the art.

The driving sheave assembly 30 with its portion 34 and disc portion 35 is made as a single-piece metal construction and may be made by casting, machining, and similar processes. It will be appreciated that the surface 37 is a machined metal surface which provides some non-detrimental slippage upon engagement of the driven elastomeric surface 52 thereagainst. This action serves as a clutch during initial engagement of the driven surface 52 against the driving surface 37.

It will also be appreciated that, if desired, the sheave assembly 30 may be made in a similar manner as the sheave assembly 50; and, the sheave assembly 50 may be made in a similar manner as the sheave assembly 30.

The driven sheave assembly 40 is shown as a single-piece construction having grooves 41 and 42 therein which in essence define a pair of sheaves of the same diameter. However, it will be appreciated that the sheave assembly 40 may be made of a plurality of sheaves of different diameters as shown in FIG. 6 wherein the sheave assembly 40 is made of a small sheave 102 and a larger sheave 103. The two sheaves 102 and 103 are fastened together by a plurality of bolts 104 arranged on a common bolt circle and each bolt employes an associated nut 105. A plurality of spacers 106 are provided to maintain the desired spacing at teh outer portions of the sheaves 102 and 103. The sheave 103 being of larger diameter provides a slower rotation of the sheave assembly 40 in its clockwise mode of operation.

the movable sheave assembly 50 is supported for pivoting movements by member 62 about the shaft 75 as shown in FIGS. 1 and 2. With this arrangement it is possible to position the shaft 75 and control the length of the member 82 in a precise manner and thereby control the tension and thus the loading of the belt 65 which is preferably the belt which provides reverse movement of the machine on which the belt drive system is used. Thus, the belt tension is controlled so that it is greater when the movable sheave assembly 50 engages the driving sheave assembly 30 as shown in FIG. 2 and such tension is less when the sheave assembly 50 is arranged remote from the sheave assembly 30 and, in esence, this is the situation illustrated in FIGS. 2 and 1 respectively.

However, as seen in FIG. 7, it will be appreciated that the link or member 62 may be of extended length and the shaft thereof which supports the member 62 for pivoting movement may be on the same axis as the shaft for the sheave assembly 40 whereby a constant tension is provided in the belt 65 regardless of the position of the movable sheave assembly 50.

In any event, regardless of whether the dual-purpose means 70 has a member 62 which assures provision of constant tension in its belt 65 or the provision of greater tension during loading of such belt, the belt 65 is alsways operating in a non-slipping manner whereby the wear on the belt 65 is kept at a minimum.

During reverse operation of the machine 20 which uses the belt drive system 21, the belt 65 provides movement of the driven sheave assembly 40 through the action of the driven surface 52 and belt 65 and it iwll be appreciated that the belt 63 is slipping. However, inasmuch as the reverse operation of the machine 20 is only a small percentage of the total operating time of the machine, i.e., generally of the order of less than 10 percent, there is also minimum wear of the forward driving belt 63 due to the purposefully induced slippage thereof.

In FIGS. 1 and 2 the tensioning roller or sheave 71 comprising the dual-purpose means 70 is shown operatively connected to sheave assembly 50 of the mechanical member 50. However, as shown in FIG. 7 it will be appreciated that the belt tensioning roller 71 need not necessarily be operatively connected so that it operates substantially in unison with member 62 supporting the sheave assembly 50. For example, the roller 71 may be moved by a suitable actuating device shown schematically by a block diagram 110 and a connecting actuating member shown schematically by an arrow 111. The member 111 is used to pivot link 72 about its pivot shaft and the movement is providedd substantially in unison with the movement of sheave assembly 50 so that in the condition illustrated in FIG. 1 of the drawing the movable sheave assembly 30 and the tensioning roller 71 engages the belt 63 essentially as shown in FIG. 1. Similarly, during movement of the sheave assembly by device 85 and member 86 into the position as illustrated in FIG. 2 the tensioning roller 71 is moved out of tensioning engagement with the blet 63 by devices 110 and 111 and as indicated in FIG. 7.

Thus, it is seen that with the unique belt drive system of this invention the machine 20 does not require a special reversible driving shaft. Further, the reverse belt of the systme 21 runs substantially continuously under a no-load condition until the movable sheave assembly 50 is moved so that its driven surface 52 is brough into engagement with the driving surface 37 of the driving sheave assembly 30.

The belt drive assembly system 21 of this invention may be used with a varible speed forward drive to provide a complete range of forward speeds, plus reverse.

Also, as illustrated in FIG. 6 of the drawings, by employing sheaves of different diameters as driven sheaves, for example, any desired speed ratio may be obtained for forward or reverse.

In this disclosure of the invention the power input shaft or driving shaft has been described as being the shaft 22 and the shaft 24 has been described as the driven shaft. However, it will be appreciated that the belt drive system of this invention may be made to operate equally well by making the shaft 24 the driving shaft and the shaft 22 the driven shaft.

The belts 63 and 65 are shown and described as being standard V-belts having the usual substantial trapezoidal cross-sectional configuration; and, each of such belts is cross-hatched generally as made of rubber. However, it is to be understood that each belt used in the drive system ay be of any suitable configuration known in the art and may be a flat belt, multiple element belt, or a so-called banded belt.

It will also be appreciated that a plurality of more than two belts may be operatively engaged in associated grooves of a sheave assembly similar to assembly 40 and the additional belts may be used to perform other desired functions of a suitable machine such as the machine 20, for example.

While present exemplary embodiment of this invention, and methods of practicing the same, have been illustrated and described, it will be recognized that this invention may be otherwise variously embodied and practiced within the scope of the following claims.

What is claimed is:

1. In an apparatus having a driving shaft which is rotatable at a first position in one direction only and a driven shaft which is rotatable at a second position remote from said first position, the improvement comprising a belt drive system for selectively rotating said driven shaft in said one direction and in an opposite direction, said belt drive system comprising, a driving sheave assembly fastened to said driving shaft, said driving sheave assembly having means defining a first belt-receiving groove and having a right circular cylindrical driving surface, a driven sheave assembly fastened to said driven shaft and having means defining a first and a second belt-receiving groove, a movable sheave assembly which is movable toward and away from said driving sheave assembly, said movable sheave assembly having means therein defining a second belt-receiving groove and having a right circular cylindrical driven surface, a first belt disposed in said first grooves for rotating said driven sheave assembly in said one direction with said movable sheave assembly disposed in spaced relation from said driving sheave assembly, a second belt disposed in said second grooves, and means serving the dual prupose of moving said movable sheave assembly with its driven surface into engagement with said driving surface and creating slack in said first belt rendering it inoperative so that said driving sheave assembly provides rotation of said driven sheave assembly in said opposite direction through the action of said second belt.

2. An apparatus as set forth in claim 1 wherein said means in said sheave assemblies defining belt-receiving grooves comprises cooperating sets of opposed inclined surfaces and said first and second belts are in the form of V-belts each having a trapezoidal cross-sectional configuration.

3. An apparatus as set forth in claim 1 wherein said driving surface of said driven sheave assembly is a metal surface.

4. An apparatus as set forth in claim 1 wherein said driven surface of said driven sheave assembly is made of an elastometric material having a comparatively high coefficient of friction.

5. An apparatus as set forth in claim 4 wherein said elastomeric material is rubber.

6. An apparatus as set forth in claim 1 wherein said means serving said dual purpose comprises a tensioning roller adapted to engage said first belt to provide tension therein during rotation of said driven sheave assembly in said one direction.

7. An apparatus as set forth in claim 6 in which said means serving said dual purpose comprises a first actuating device for moving said movable sheave assembly and a second actuating device for moving said tensioning roller.

8. An apparatus as set forth in claim 1 wherein said means serving said dual purpose compises a mechanical linkage, said linkage comprising a member operatively connecting said movable sheave assembly and tensioning roller for movement together.

9. An apparatus as sset forth in claim 1 in which said driving sheave assembly is defined as a single-piece construction having an integral sheave provided with its first belt-receiving groove and an integral disc having said right circular cylindrical driving surface defined thereon.

10. An apparatus as set forth in claim 9 in which said driving surface is a machined metal surface.

11. An apparatus as set forth in claim 1 in which said movable sheave assembly has a pair of flange portions which are fixed together to define said second belt-receiving groove thereof.

12. An apparatus as set forth in claim 11 in which said movable sheave assembly has a tubular outer portion defined as an integral part of one of said flange portions and further comprising an elastomeric annular member fixed to said outer portion and having an outside surface defining said driven surface.

13. An apparatus as set forth in claim 12 in which said elastomeric member is a rubber member.

14. An apparatus as set forth in claim 1 in which said driven sheave assembly is a single-piece construction having its first and second belt-receiving grooves defined therein.

15. An apparatus as set forth in claim 1 in which said driven sheave assembly is comprised of a plurality of sheaves of different sizes.

16. A sheave assembly for a belt drive system comprising, means defining at least one belt-receiving groove for receiving an associated belt therein, a right circular cylindrical frictional power-transmitting surface on said assembly adjacent said means defining said belt-receiving groove, said sheave assembly being adapted to transmit power due to cooperating action or said power-transmitting surface and said means defining said belt-receiving groove, said means defining said belt-receiving groove comprising a pair of flange members having a pair of cooperating inclined surfaces defining said belt-receiving groove, and a tubular portion extending from an edge portion of one of said flange members, said right ciruclar cylindrical fricitional powertransmitting surface being carried by said tubular portion.

17. A sheave assembly as set forth in claim 16 and further comprising bearing means for supporting said sheave assembly on an associated support shaft for friction-free rotation.

18. A sheave assembly as set forth in claim 17 in which said bearing means is a ball bearing assembly.

19. A sheave assembly as set forth in claim 16 and further comprising means fixing said pair of flange members together on a common circumference concentric about the axis of rotation of said sheave assembly.

20. A sheave assembly as set forth in claim 19 in which said flange members have portions disposed inwardly of said fixing means which define a bearing housing and further comprising antifriction bearing means for said sheave assembly disposed within said housing.

21. A sheave assembly as set forth in claim 19 in which said fixing means comprises a plurality of rivets.

22. A sheave assembly as set forth in claim 16 and further comprising an annular member made of an elastomeric material and bonded against said tubular portion, said annular member having said right circular cylindrical friction surface defined thereon.

23. A sheave assembly as set forth in claim 22 in which said annular member is made of rubber and further comprising adhesive means fixing said annular member to said tubular portion.

24. A sheave assembly as set forth in claim 16 in which said tubular member is interconnected to said edge portion of said one flange member by an L-shaped interconnecting portion.

25. A sheave assembly as set forth in claim 24 in which said flange members are stamped sheet metal members and said one flange member has its tubular portion and L-shaped interconnecting portion made as a single piece construction.

26. A sheave assembly as set forth in claim 25 in which said stamped shoot metal members are fixed together by a plurality of fasteners on a common circumference concentric about the axis of rotation of said sheave assembly.

27. In an apparatus having a driving shaft which is rotatable at a second position remote from said first position, the improvement comprising a belt drive system for selectively rotating said driven shaft in said one direction and in an opposite direction, said belt drive system comprising, a driving sheave assembly fastened to said driving shaft, said driving sheave assembly having means defining a first belt-receiving groove and having a right circular cylindrical driving surface, a driven sheave assembly fastened to said driven shaft and having means defining a first and a second belt-receiving groove, a movable sheave assembly which is movable toward and away from said driving sheave assembly, said movable sheave assembly being defined by a pair of flange members having a pair of cooperating inclined surfaces defining a second belt-receiving groove with one of said flange members having a tubular portion extending from an edge portion thereof and a right circular cylindrical driven surface thereon, a first belt disposed in said first grooves for rotating said driven sheave asaembly in said one direction with said movable sheave assembly disposed in spaced relation from said driving sheave assembly, a second belt disposed in said second grooves, and means serving the dual purpose of moving said movable sheave assembly with its driven surface into engagement with said driving surface and creating slack in said first belt rendering it inoperative so that said driving sheave assembly provides rotation of said driven sheave assembly in said opposite direction through the action of said second belt.

28. An apparatus as set forth in claim 27 and further-comprising an annular member made of an elastomeric material and bonded against said tubular portion, said annular member having said right circular cylindrical driven surface defined thereon as a friction surface.

* * * * *

UNITED STATES PATENT OFFICE
CERTIFICATE OF CORRECTION

Page 1 of 3

PATENT NO. : 4,046,022
DATED : September 6, 1977
INVENTOR(S) : Dewey D. Henderson It is certified that error appears in the above-identified patent and that said Letters Patent are hereby corrected as shown below:

Col. 1, line 29, omit entire line "driving shaft which is rotatable at a first position in one"

Col. 1, line 31, "form" should be --from--

Col. 2, line 43, "numberal" should be --numeral--

Col. 2, line 48, "numberal" should be --numeral--

Col. 3, line 9, "shaeve" should be --sheave--

Col. 3, line 22, "inlcined" should be --inclined--

Col. 3, line 33, "the" should be --The--

Col. 3, line 40, "numberal" should be --numeral--

Col. 3, line 41, "numberal" should be --numeral--

Col. 4, line 2, "numberal" should be --numeral--

Col. 4, line 17, after "65" insert --taut and free of slack the clockwise rotation is imparted to the belt 65--

Col. 4, line 33, "porition" should be --portion--

Col. 4, line 40, "meoves" should be --moves--

Col. 4, line 59, "drivin" should be --driven--

UNITED STATES PATENT OFFICE
CERTIFICATE OF CORRECTION

PATENT NO. : 4,046,022

DATED : September 6, 1977

INVENTOR(S) : Dewey D. Henderson

It is certified that error appears in the above-identified patent and that said Letters Patent are hereby corrected as shown below:

Col. 5, line 36, "knwon" should be --known--

Col. 5, line 61, "teh" should be --the--

Col. 5, line 66, "the" should be --The--

Col. 6, line 10, "esence" should be --essence--

Col. 6, lines 22 and 23, "als-ways" should be --al-ways--

Col. 6, line 28, "iwll" should be --will--

Col. 6, line 48, "providedd" should be --provided--

Col. 6, line 51, after "assembly", insert --50 is disposed remote from the sheave assembly--

Col. 6, line 56, "blet" should be --belt--

Col. 6, line 61, "systme" should be --system--

Col. 6, line 63, "brough" should be --brought--

Col. 7, line 17, "ay" should be --may--

Col. 7, line 26, "embodiment" should be --embodiments--

Col. 8, line 59, "or" should be --of--

Col. 8, line 66, "ciruclar" should be --circular--

UNITED STATES PATENT OFFICE
CERTIFICATE OF CORRECTION

Page 3 of 3

PATENT NO. : 4,046,022
DATED : September 6, 1977
INVENTOR(S) : Dewey D. Henderson It is certified that error appears in the above-identified patent and that said Letters Patent are hereby corrected as shown below:

Col. 9, line 38, "shoot" should be --sheet--

Col. 10, line 4, after "a", insert --first position in one direction only and a driven shaft which is rotatable at a--

Signed and Sealed this

Sixth Day of December 1977

[SEAL]

Attest:

RUTH C. MASON
Attesting Officer

LUTRELLE F. PARKER
Acting Commissioner of Patents and Trademarks